US007737417B2

(12) United States Patent
Giering et al.

(10) Patent No.: US 7,737,417 B2
(45) Date of Patent: Jun. 15, 2010

(54) DEVICE AND METHOD FOR VERIFYING VALUE DOCUMENTS

(75) Inventors: Thomas Giering, Kirchseeon (DE); Michael Bloss, München (DE); Wolfgang Deckenbach, Schechen (DE); Martin Clara, München (DE); Hans-Peter Ehrl, Wolfratshausen (DE)

(73) Assignee: Giesecke & Devrient, Munich (DE)

( * ) Notice: Subject to any disclaimer, the term of this patent is extended or adjusted under 35 U.S.C. 154(b) by 291 days.

(21) Appl. No.: 11/658,005

(22) PCT Filed: Jul. 19, 2005

(86) PCT No.: PCT/EP2005/007872

§ 371 (c)(1), (2), (4) Date: Jan. 28, 2008

(87) PCT Pub. No.: WO2006/010537

PCT Pub. Date: Feb. 2, 2006

(65) Prior Publication Data

US 2008/0135780 A1 Jun. 12, 2008

(30) Foreign Application Priority Data

Jul. 22, 2004 (DE) ....................... 10 2004 035 494

(51) Int. Cl.
*G01N 21/64* (2006.01)

(52) U.S. Cl. .................................................. 250/458.1

(58) Field of Classification Search .............. 250/458.1, 250/271

See application file for complete search history.

(56) References Cited

U.S. PATENT DOCUMENTS

| | | | | |
|---|---|---|---|---|
| 3,922,090 | A | 11/1975 | Fain | |
| 4,807,006 | A * | 2/1989 | Rogers et al. | 257/184 |
| 5,978,025 | A * | 11/1999 | Tomasini et al. | 348/302 |
| 6,040,901 | A | 3/2000 | Stapfer et al. | |
| 6,061,121 | A | 5/2000 | Holl et al. | |
| 6,297,509 | B1 * | 10/2001 | Lipkowitsch et al. | 250/461.1 |
| 7,067,824 | B2 * | 6/2006 | Muller et al. | 250/458.1 |
| 2002/0185615 | A1 | 12/2002 | Giering | |

(Continued)

FOREIGN PATENT DOCUMENTS

DE 101 27 837 A1 1/2003

(Continued)

OTHER PUBLICATIONS

Search Report of German Patent Office in German 10 2004 035 494.4 (Jul. 22, 2004).

(Continued)

*Primary Examiner*—David P Porta
*Assistant Examiner*—Kiho Kim
(74) *Attorney, Agent, or Firm*—Bacon & Thomas, PLLC

(57) ABSTRACT

A method and apparatus for checking luminescent value documents, in particular bank notes, with a luminescence sensor. The value document to be checked is irradiated to excite luminescence radiation, and the luminescence radiation emanating from the value document is detected with spectral resolution. Since the value document to be checked is transported past the luminescence sensor in the transport direction and is illuminated with an illumination area which extends in the transport direction, an effective measurement is possible even of value documents that emit very little luminescence radiation.

30 Claims, 6 Drawing Sheets

U.S. PATENT DOCUMENTS

| | | | | |
|---|---|---|---|---|
| 2002/0191175 | A1 | 12/2002 | Coombs et al. | |
| 2003/0007236 | A1* | 1/2003 | Schachar et al. | 359/290 |
| 2003/0160182 | A1* | 8/2003 | Petrich et al. | 250/458.1 |
| 2004/0031931 | A1 | 2/2004 | Müller et al. | |
| 2004/0129893 | A1 | 7/2004 | Usami et al. | |
| 2004/0169784 | A1 | 9/2004 | Miyashita et al. | |
| 2004/0178044 | A1 | 9/2004 | Mori et al. | |
| 2004/0183004 | A1* | 9/2004 | Niggemann et al. | 250/271 |
| 2004/0200978 | A1* | 10/2004 | Kamijo | 250/458.1 |
| 2005/0213227 | A1 | 9/2005 | Fujimori et al. | |

FOREIGN PATENT DOCUMENTS

| | | | |
|---|---|---|---|
| EP | 1 158 459 | A1 | 11/2001 |
| EP | 1 211 545 | A2 | 6/2002 |
| EP | 1 457 935 | A1 | 9/2004 |
| GB | 1 439 173 | | 6/1976 |
| WO | WO 95/19019 | | 7/1995 |
| WO | WO 98/41955 | | 9/1998 |

OTHER PUBLICATIONS

International Search Report in PCT/EP2005/007872 (Oct. 31, 2005).
Search Report of EPO Related to EP 06 01 1480 (Nov. 15, 2006).

* cited by examiner

DEVICE AND METHOD FOR VERIFYING VALUE DOCUMENTS

FIELD OF THE INVENTION

This invention relates to an apparatus and method for checking in particular luminescent value documents wherein the value document is irradiated with light and the luminescence radiation emanating from the value document is detected with spectral resolution.

BACKGROUND

Such luminescent value documents can be e.g. bank notes, checks, coupons or chip cards. Although not restricted thereto, the present invention deals primarily with the check of bank notes. The latter typically contain in the paper or printing ink a feature substance or a mixture of a plurality of feature substances that show luminescence behavior, e.g. that fluoresce or phosphoresce.

There are a number of known systems for checking the authenticity of such value documents. One system is known for example from DE 23 66 274 C2. In this system, to check the authenticity of a bank note, i.e. check specifically whether a fluorescent feature substance is actually present in a bank note to be checked, the latter is irradiated obliquely and the perpendicularly remitted fluorescence radiation detected with spectral resolution using an interference filter. Evaluation is done by comparing the signals from different photocells of the spectrometer.

This system works very reliably in most cases. However, there is a need for a luminescence sensor that has a more compact construction and can still check reliably enough at very low intensities of the luminescence radiation to be detected.

SUMMARY OF THE INVENTION

On these premises it is a problem of the present invention to provide an apparatus and method for checking luminescent value documents that permit a reliable check with a compact luminescence sensor.

Since the value document to be checked transported past the luminescence sensor in a transport direction is illuminated with an illumination area extending in the transport direction, it is also possible to effectively measure value documents that emit very little luminescence radiation. This substantially improves in particular the measurement of phosphorescence radiation.

It is specially emphasized that the features of the dependent claims and the embodiments stated in the following description can be used advantageously in combination or also independently of each other and of the subject matter of the main claims, e.g. also in apparatuses that do not produce an illumination area extending in the transport direction or that perform a measurement of radiation other than luminescence radiation.

BRIEF DESCRIPTION OF THE DRAWINGS

Further advantages of the present invention will hereinafter be explained more closely by way of example with reference to the enclosed drawings. The figures are described as follows.

DETAILED DESCRIPTION OF THE PREFERRED EMBODIMENTS

The inventive apparatuses can be used in all kinds of apparatuses for checking optical radiation, in particular luminescence radiation. Although not restricted thereto, the following description will relate to the preferred variant of checking bank notes in bank note processing apparatuses that can be used for example for counting and/or sorting and/or depositing and/or dispensing bank notes.

Figure 1:
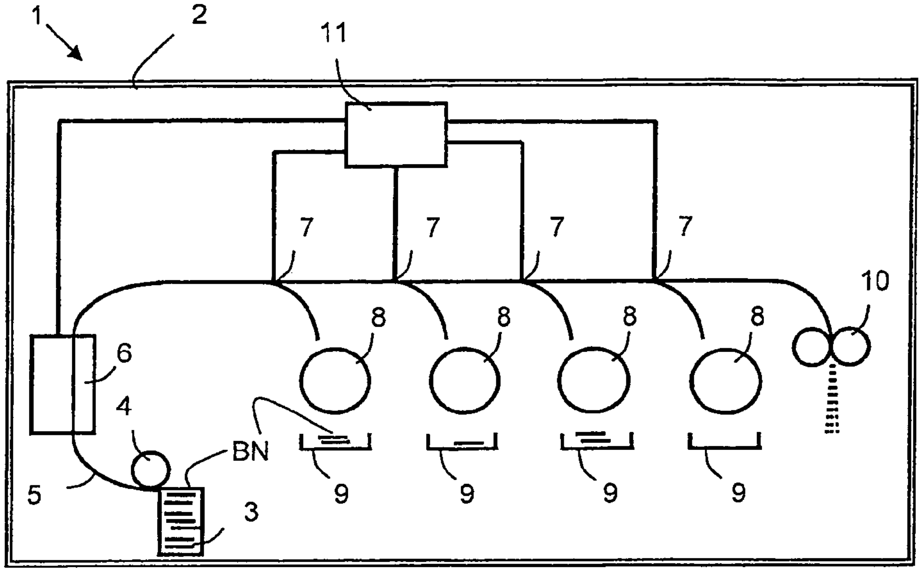
FIG. 1 a schematic view of a bank note sorting apparatus.

FIG. 1 shows such a bank note sorting apparatus 1 in exemplary fashion. The bank note sorting apparatus 1 has in a housing 2 an input pocket 3 for bank notes BN to which bank notes BN to be processed can either be manually fed from outside or bank-note bundles can be automatically supplied, optionally after debanding. The bank notes BN fed to the input pocket 3 are removed singly from the stack by a singler 4 and transported through a sensor device 6 by means of a transport device 5. The sensor device 6 can have one or more sensor modules integrated in a common housing or mounted in separate housings. The sensor modules can be used e.g. for checking the authenticity and/or state and/or nominal value of the checked bank notes BN. After running through the sensor device 6 the checked bank notes BN are then sorted in dependence on the check results of the sensor device 6 and given sorting criteria and output via gates 7 and associated spiral slot stackers 8 into output pockets 9 from which they can be either removed manually or carried off automatically, optionally after banding or packaging. A shredder 10 can also be provided for destroying bank notes BN classified as authentic and no longer fit for circulation. The control of the bank note sorting apparatus 1 is effected by means of a computer-aided control unit 11.

Figure 2:
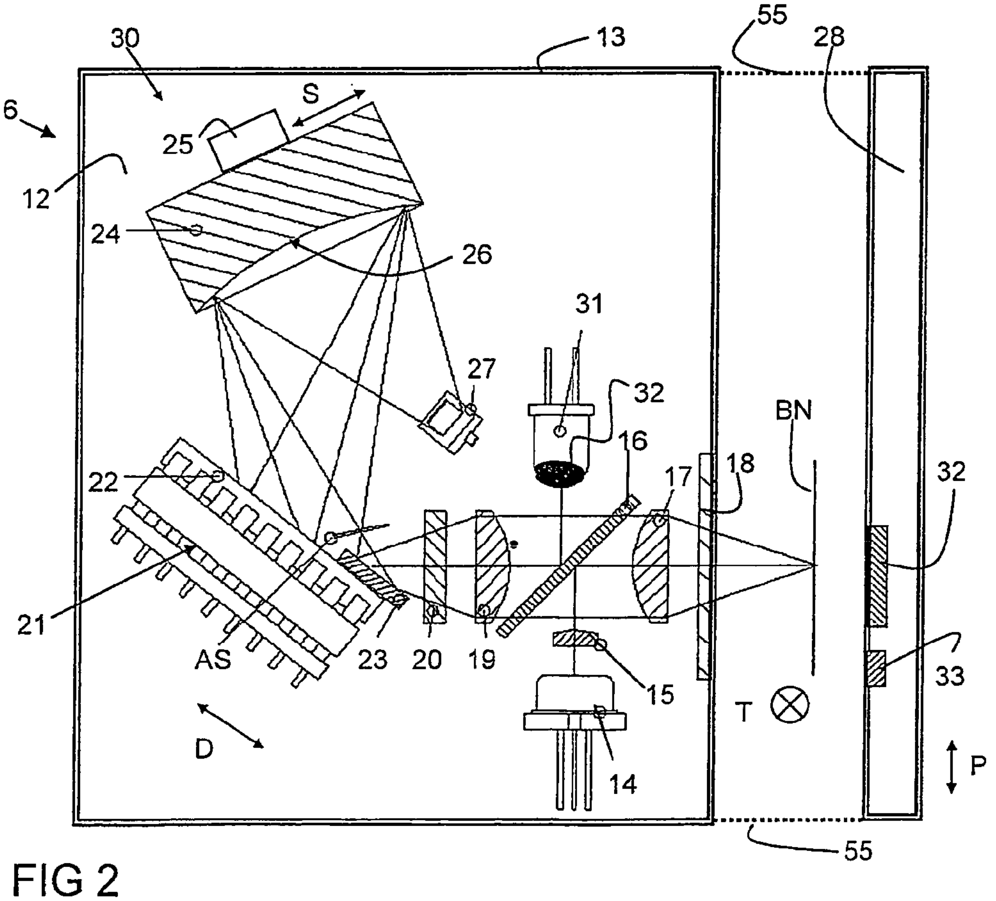
FIG. 2 a schematic side view of the inside of an inventive luminescence sensor that can be used in the bank note sorting apparatus according to FIG. 1.
Figure 3:
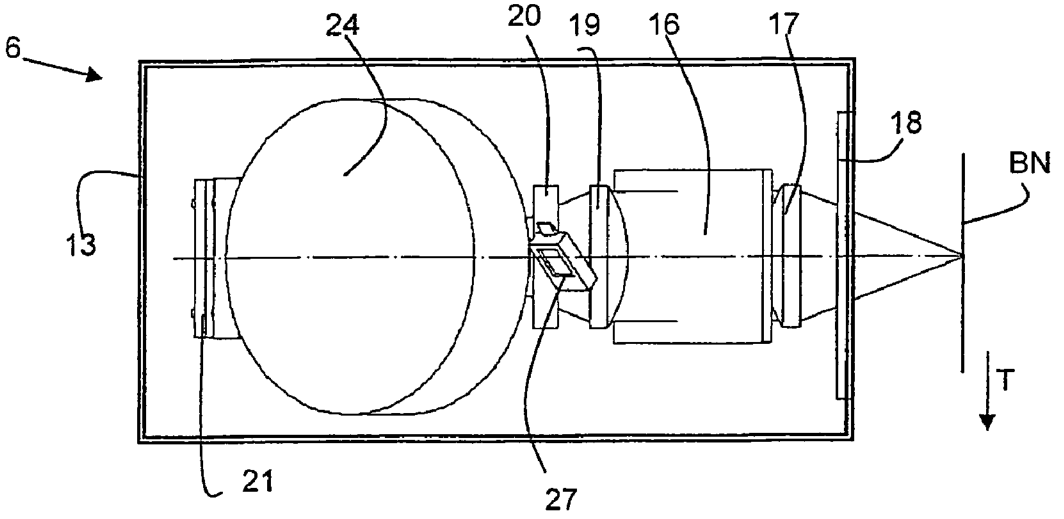
FIG. 3 components of the luminescence sensor of FIG. 2 in a top view.

As mentioned above, the sensor device 6 can have different sensor modules. The sensor device 6 is characterized in particular by a sensor module 12 for checking luminescence radiation, to be referred to hereinafter for short as luminescence sensor 12. FIG. 2 illustrates in a schematic cross-sectional view the inner structure and the arrangement of the optical components of a luminescence sensor 12 with a particularly compact design according to an embodiment of the present invention. FIG. 3 moreover shows a top view of a part of said components located inside the luminescence sensor 12. Said luminescence sensor 12 is of particularly compact design and optimized with regard to high signal-to-noise ratios.

The luminescence sensor 12 specifically has in a common housing 13 both one or more light sources 14 for exciting luminescence radiation, and a detector 30, preferably a spectrometer 30, for spectrally decomposed detection of the luminescence light. The housing 13 is sealed in such a way that unauthorized access to the components contained therein is not possible without damaging the housing 13.

The light source 14 can be e.g. an LED, but preferably a laser light source such as a laser diode 14. The laser diode 14 can emit one or more different wavelengths or wavelength ranges. If a plurality of different wavelengths or wavelength ranges are used, it can also be provided that the same light source housing or separate light source housings, i.e. separate light source modules, contain a plurality of light sources 14 for different wavelengths or wavelength ranges which are disposed e.g. side by side and preferably radiate parallel light which can be projected onto the same place or adjacent places on the bank note BN.

If the light sources 14 can emit light of a plurality of different wavelengths or wavelength ranges, it can be provided that the individual wavelengths or wavelength ranges are activable selectively.

A further variant will be described hereinafter with reference to FIG. 4.

The light emanating from the laser diode 14 is radiated by means of an imaging optic 15, 16, 17 onto a bank note to be checked. The imaging optic comprises a collimator lens 15, a deflection mirror as a beam splitter 16, in particular a dichroic beam splitter 16, which deflects by 90° the laser beam emanating from the laser diode 14 and shaped by the collimator lens 15, and a condenser lens 17 with a large angle of beam spread which images the deflected laser beam through a front glass 18 preferably perpendicularly onto the bank note BN to be checked transported past in the direction T by means of the transport system 5, thereby exciting the bank note BN to emit luminescence radiation.

With the help of the spectrometer 30 the luminescence radiation emanating from the illuminated bank note BN is then preferably detected likewise perpendicularly, i.e. coaxially to the excitation light. This leads to a lower interference sensitivity through orientation tolerances of the transported bank notes BN on the measurements than in the case of oblique illumination e.g. according to DE 23 66 274 C2.

The optic for imaging the luminescence radiation onto a photosensitive detector unit 21 likewise comprises the front glass 18, the condenser lens 17 and the mirror 16 at least partly transparent to the luminescence radiation to be measured. Moreover, the optic subsequently has a further condenser lens 19 with a large opening, a following filter 20 designed to block the illumination wavelength of the light source 14 and other wavelengths not to be measured, and a deflection mirror 23. The deflection mirror 23 serves to fold the beam path and deflect the luminescence radiation to be measured onto an imaging grating 24 or another device for spectral decomposition 24. The deflection mirror is advantageously mounted parallel or almost parallel to the focal plane of the spectrometer (angle <15 degrees) for as compact a structure as possible. The imaging grating 24 has a wavelength dispersing element with a concave mirror 26 which preferably images the first-order or minus first-order luminescence radiation onto the detector unit 21. Higher orders can also be imaged, however. The detector unit 21 preferably has a detector row 22 comprising a plurality of photosensitive pixels, i.e. image points, disposed in a row, as described hereinafter by way of example e.g. with respect to FIG. 6 or 7.

The entrance slit of the spectrometer 30 is marked in FIG. 2 by the reference sign AS. The entrance slit AS can be present in the housing 13 in the form of an aperture AS in the beam path. However, it is also possible that there is no aperture present at this point, but only a "virtual" entrance slit AS which is given by the illumination track of the light source 14 on the bank note BN. The latter variant leads to higher light intensities, but can also lead to an undesirable greater sensitivity to ambient light or scattered light.

In a further embodiment, the deflection mirror 23 is so placed with respect to the imaging grating 24 that the entrance slit AS falls on the area of the deflection mirror 23. Since this makes the beam cross section of the radiation to be deflected particularly small on the deflection mirror 23, the deflection mirror 23 itself can also have particularly small dimensions. If the deflection mirror 23 is a component of the detector unit 21, the deflection mirror 23 can thus be mounted not only above the photosensitive areas of the detector unit 21, according to FIG. 2, but also beside them.

It is a special idea of the present invention that the light source 14 for exciting luminescence radiation produces an elongate illumination area 35 extending in the transport direction T on the bank note BN to be checked.

This variant has the advantage that the luminescent, in particular phosphorescent, feature substances usually present in the bank notes BN only in very low concentrations are pumped up longer by the illumination area extending in the transport direction during transport past the luminescence sensor 12, thereby increasing in particular the radiation intensity of the persistent phosphorescent feature substances.

Figure 5:
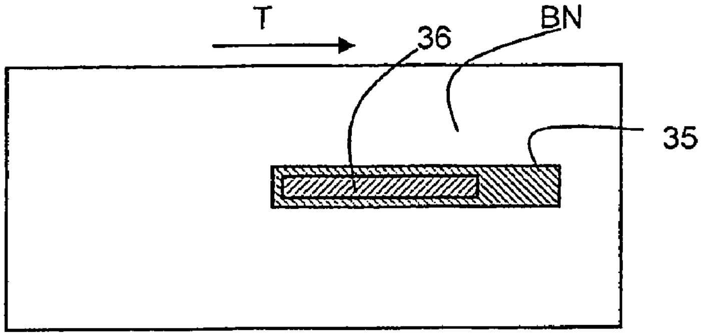
FIG. 5 a schematic view of a bank note to explain the use of the luminescence sensor of FIGS. 2 and 3.

FIG. 5 illustrates an associated instantaneous view. An elongate illumination area 35 extending in the transport direction T can be understood to mean that the illumination radiation irradiates at a given moment an area of any form, in particular a rectangular track, on the bank note that is significantly larger in the transport direction T than perpendicular to the transport direction T. Preferably, the extension of the illumination area 35 in the transport direction T will be at least twice, particularly preferably at least three times, four times or five times, as long as the extension perpendicular to the transport direction T.

FIG. 5 illustrates with a different hatching likewise the image area 36, i.e. the entrance pupil 36 of the spectrometer 30, i.e. that area of the bank note BN that is imaged onto the spectrometer 30 at the given moment according to the dimensions of the entrance slit AS. It can be recognized that the length and width of the entrance pupil 36 of the spectrometer 30 are preferably smaller than the corresponding dimensions of the illumination area 35 of the laser diode 14. This permits greater alignment tolerances for the individual sensor components.

Further, the instantaneous view of FIG. 5 shows the case that the illumination area 35 extends substantially further in the transport direction T than against the transport direction T in comparison with the image area 36. This is particularly advantageous for utilizing the increased pump-up effect. However, it can alternatively also be provided that the illumination area 35 and the image area 36 overlap only partly in the transport direction T. If the image area 36 is disposed symmetrically, i.e. in the middle of the illumination area 35, however, the luminescence sensor 6 can be transported both in apparatuses 1 in which bank notes BN are transported in the transport direction T shown and in apparatuses 1 in which bank notes BN are transported in the opposite direction −T.

According to a further special idea of the present invention, different detector units 21, 27 are used for detecting the luminescence radiation, in particular the luminescence radiation emanating from the device for spectral decomposition 24, e.g. the imaging grating 24. Thus, it is possible to provide on or before the further detector unit 27 e.g. a filter for measuring only in one or more given wavelengths or wavelength ranges, whereby the measurable spectral ranges of the different detector units 21, 27 preferably differ and e.g. overlap only partly or not at all. It is emphasized that a plurality of further detector units 27 can also be present that measure in different wavelengths or wavelength ranges. The plurality of further detector units 27 can be spaced apart or also be present in a sandwich structure, as described by way of example in DE 101 27 837 A1.

While the one detector unit 21, i.e. specifically the detector row 22, is designed for spectrally resolved measurement of the luminescence radiation of the bank note BN, the at least one further detector unit 27 can thus be used to perform at least one other measurement of the luminescence radiation, such as additionally or alternatively a measurement of the broadband, spectrally unresolved zeroth order of the spectrometer 30 and/or the decay behavior of the luminescence radiation.

Further, the further detector unit 27 can also be designed to check another optical property of the at least one feature substance of the bank note BN. This can be done e.g. by the stated measurements at other wavelengths or wavelength ranges. Preferably, the further detector unit 27 can also be designed to check another feature substance of the bank note BN. Thus, e.g. the detector row 22 can be designed for measuring the optical properties of a first feature substance of the bank note BN, and the further detector unit 27 for measuring another feature substance of the bank note BN, in particular also in a different spectral range from the detector row 22. The detectors 22, 27 will preferably have filters for suppressing undesirable scattered light or higher-order light during measurement.

As can be recognized in the plan view of FIG. 3, said further detector unit 27, in particular when designed for measuring the zeroth order of the spectrometer 30, can be disposed on a tilt with respect to the imaging grating 24 and the detector row 22 to avoid a disturbing re-reflection onto the concave mirror 26. In this case, a radiation-absorptive light trap, such as a black colored area, can additionally be present at the end of the beam path of the radiation emanating from the further detector unit 27.

For calibration and functional testing of the luminescence sensor 12, a reference sample 32 with one or more luminescent feature substances can further be provided, which can have an identical or different chemical composition to the luminescent feature substances to be checked in the bank notes BN. As shown in FIG. 2, said reference sample 32 can be integrated in the housing 13 itself and applied e.g. as a foil 32 to a further light source (LED 31) which is disposed opposite the laser diode 14 with respect to the beam splitter 16. The reference sample 32 can instead e.g. also be a separate component between LED 31 and angular mirror 16. For calibration e.g. in the pauses between two bank note measuring cycles of the luminescence sensor 12 the reference sample 32 can then be excited by irradiation by means of the LED 31 to emit a defined luminescence radiation which is imaged onto the detector row 22 by parasitic reflection on the dichroic beam splitter 16 and evaluated.

For intensity calibration of the spectrometer 30, the luminescent feature substances of the reference sample 32 can emit preferably broadband, e.g. over the total spectral range detectable by the spectrometer 30. However, the luminescent feature substances of the reference sample 32 can alternatively or additionally emit a certain characteristic spectral signature with narrowband peaks for performing a wavelength calibration. However, it is also possible that only the further light source 31 without the reference sample 32 is used for adjustment of the spectrometer 30.

Alternatively or additionally, the reference sample 32 can therefore also be mounted outside the housing 13, in particular on the opposite side with respect to the bank note BN to be measured, and be integrated e.g. in an opposing element, such as a plate 28.

Outside the housing 13 an additional detector unit 33 can also be present as a separate component or integrated in the plate 28. The additional detector unit 33 can be e.g. one or more photocells for measuring the radiation of the laser diode 14 that has passed through the front glass 18 and optionally through the bank note BN, and/or the luminescence radiation of the bank note BN. In this case, the plate 28 can be mounted displaceably in direction P in a guide, so that alternatively either the reference sample 32 or the photocell 33 can be aligned with the illumination radiation of the laser diode 14.

The plate 28 will preferably be connected to the housing 13 via a connection element 55, drawn dotted, which is outside the transport plane of the bank notes BN. In a cross-sectional plane extending horizontally in FIG. 2 there is then an approximately U-shaped form of housing 13, connection area 55 and plate 28. This way of mounting the plate 28, also in an alternative variant without the reference sample 32 and photocell 33, has the advantage of providing a light shield against the undesirable exit of laser radiation of the laser diode 14. If the plate 28 is fastened detachably to the housing 13 for maintenance purposes or for clearing a jam, it can be provided that the laser diode 14 is deactivated when the plate 28 is detached or removed.

Figure 4:
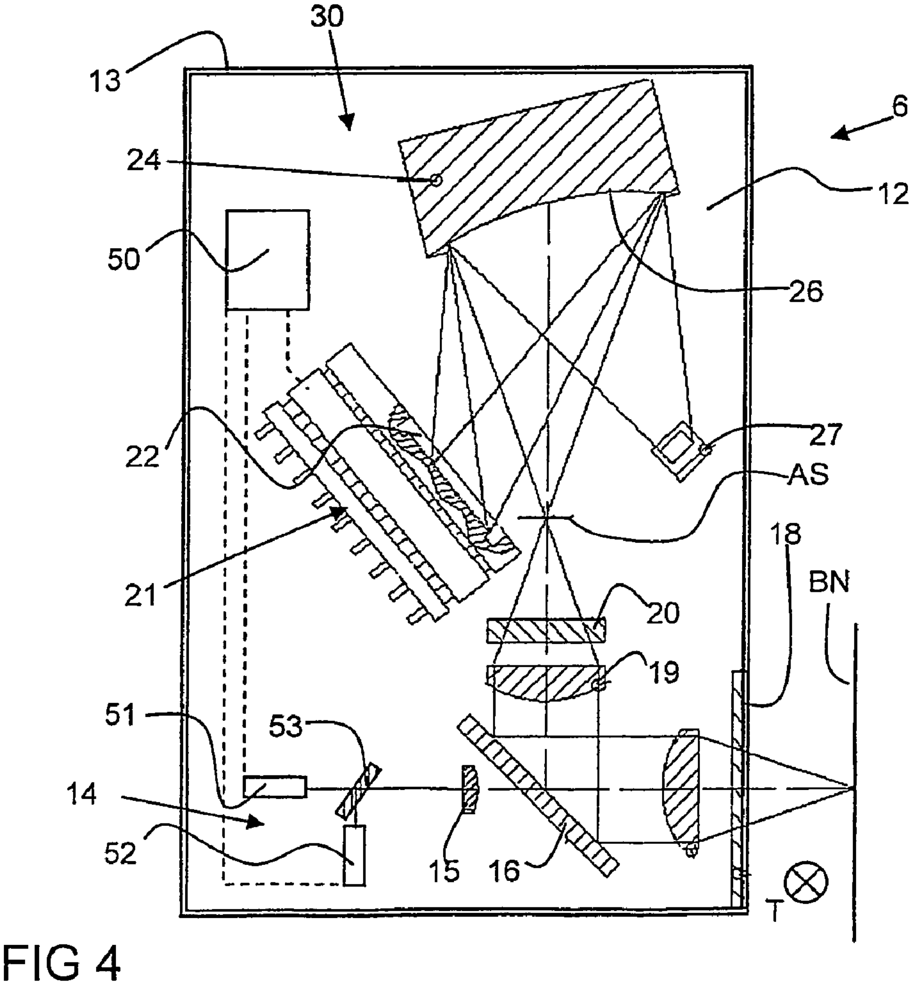
FIG. 4 a schematic side view of the inside of an alternative inventive luminescence sensor that can be used in the bank note sorting apparatus according to FIG. 1.

FIG. 4 shows a schematic cross-sectional view of an alternative and very compact luminescence sensor 6 which can be used in the bank note sorting apparatus according to FIG. 1. The same components are marked with the same reference numbers as in FIG. 2.

The arrangement of the optical components in the luminescence sensor 6 according to FIG. 4 differs from the luminescence sensor 6 according to FIG. 2 in particular in that the deflection mirror 23 can be omitted. It is noted that the luminescence sensor 6 according to FIG. 4 does not have any further detector units 31, 33 either, although this would be possible. In this case the dichroic beam splitter 16 causes not the illumination radiation, but the luminescence radiation to be deflected in mirrored fashion.

Further, the light source 14 two has mutually perpendicular laser diodes 51, 52 which emit at different wavelengths, whereby the radiation of the individual laser diodes 51, 52 can be coupled in e.g. by a further dichroic beam splitter 53, so that the same illumination area 35 or overlapping or spaced illumination areas 35 can be irradiated on the bank note BN. Preferably, either one or the other laser diode 51, 52 or both laser diodes 51, 52 can alternatively be activated simultaneously or alternatingly for radiation emission, depending on the bank note to be checked.

Figure 7:
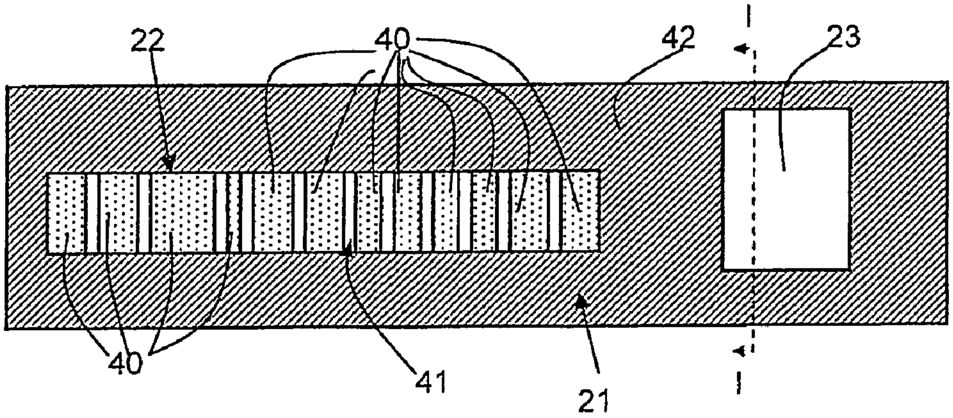
FIG. 7 a view from above of a further example of a detector row for use in the luminescence sensor of FIG. 2.

The photosensitive detector elements recognizable in an upright projection, i.e. the detector row 22, is mounted on the carrier asymmetrically, as to be explained more closely with respect to FIG. 7.

Moreover, the luminescence sensor 6 preferably has in the housing 13 itself a control unit 50 which is used for the signal processing of the measuring values of the spectrometer 30 and/or for the power control of the individual components of the luminescence sensor 6.

Figure 6:
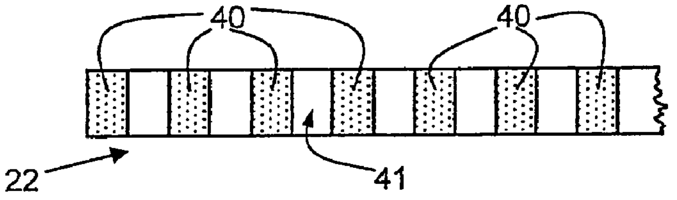
FIG. 6 a view from above of an example of a detector row for use in the luminescence sensor of FIG. 2.

With reference to FIGS. 6 and 7, two different variants of the detector rows 22 usable in the luminescence sensor 12 will now be described. FIG. 6 shows in a detail view a conventional detector row 22 which normally has more than 100 photosensitive picture elements, called pixels 40 for short, disposed side by side (of which FIG. 6 only shows the first seven left-hand pixels 40) which are equally large and spaced apart on or in a substrate 41 at a distance corresponding approximately to the width of the pixels 40.

In contrast, it is preferable to use a modified detector row 22 with a considerably smaller number of pixels 40, with a larger pixel area and a smaller share of non-photosensitive areas, as illustrated by way of example in FIG. 7. Such a modified detector row 22 has the advantage of having a considerably greater signal-to-noise ratio than the conventional detector row 22 of FIG. 6. Preferably, the modified detector rows 22 are so constructed that they have only between 10 and 32, particularly preferably between 10 and 20, single pixels 40 in or on a substrate 41. The individual pixels 40 can have dimensions of at least 0.5 mm×0.5 mm, preferably of 0.5 mm×1 mm, particularly preferably of 1 mm×1 mm. According to the embodiment of FIG. 7, the detector row 22 has by way of example twelve pixels 40 with a height of 2 mm and a width of 1 mm, the non-photosensitive area 41 between adjacent pixels 40 having an extension of about 50 μm.

Further, it can also be provided that single pixels 40 have different dimensions, in particular in the dispersion direction of the luminescence radiation to be measured, as shown in FIG. 7. Since not all wavelengths of the spectrum, but selectively only single wavelengths or wavelength ranges are normally evaluated, the pixels 40 can be constructed so as to be adapted to the particular wavelengths (or wavelength ranges) to be evaluated.

Depending on the wavelength range to be spectrally detected, the detector row 22 can consist of a different material in the stated cases. For luminescence measurements in the ultraviolet or visible spectral range, detectors made of silicon which are sensitive below about 1100 nm are particularly suitable, and for measurement in the infrared spectral range, detector rows 22 made of InGaAs which are sensitive above 900 nm. Preferably, such an InGaAs detector row 22 will be applied directly to a silicon substrate 42 which particularly preferably has an amplifier stage produced by silicon technology for amplifying the analog signals of the pixels 40 of the InGaAs detector row 22. This likewise provides a particularly compact structure with short signal paths and an increased signal-to-noise ratio.

The detector row 22 with few pixels 40 (e.g. according to FIG. 7) preferably detects only a relatively small spectral range of less than 500 nm, particularly preferably of less than or about 300 nm. It can also be provided that the detector row 22 has at least one pixel 40 that is photosensitive outside the luminescence spectrum to be measured in the bank notes BN, for performing normalizations such as baseline finding during evaluation of the measured luminescence spectrum.

The imaging grating 24 will preferably have more than about 300 lines/mm, particularly preferably more than about 500 lines/mm, i.e. diffraction elements, for permitting a sufficient dispersion of the luminescence radiation onto the detector element 21 despite the compact structure of the inventive luminescence sensors 6. The distance between imaging grating 24 and detector element 21 can be preferably less than about 70 mm, particularly preferably less than about 50 mm.

Figure 9:
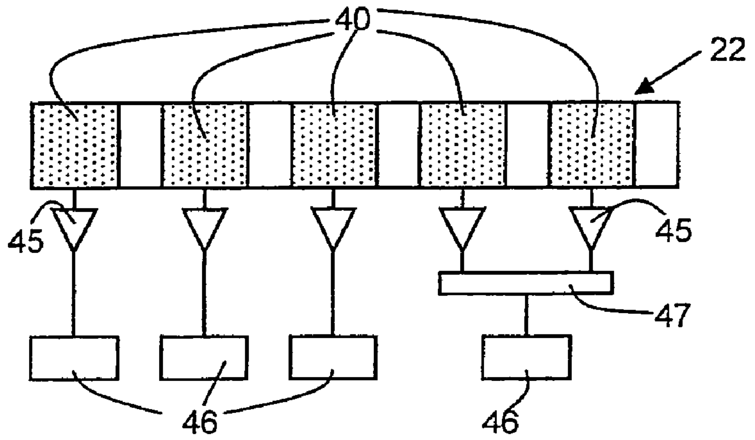
FIG. 9 a schematic representation for the readout of data from a detector row of the luminescence sensor of FIG. 2 or FIG. 4.

A readout of the individual pixels 40 of the detector row 22 can be effected here e.g. serially with the help of a shift register. However, a parallel readout of single pixels 40 and/or pixel groups of the detector row 22 will preferably be effected. According to the example of FIG. 9, the three left-hand pixels 40 are each read singly by the measuring signals of said pixels 40 being amplified using a respective amplifier stage 45, which can e.g. be part of the silicon substrate 42 according to FIG. 7, and supplied to a respective analog/digital converter 46. The two right-hand pixels in the schematic representation of FIG. 9, in turn, are first amplified by means of separate amplifier stages 45, then supplied to a common multiplex unit 47, which can optionally also comprise a sample and hold circuit, and then to a common analog/digital converter 46 which is connected to the multiplex unit 47.

The thereby permitted parallel readout of a plurality of pixels 40 or pixel groups permits short integration times and a synchronized measurement of the bank note BN. This measure likewise contributes to an increase in the signal-to-noise ratio.

According to a further independent idea of the present invention, an integration of components of the imaging optic for the luminescence radiation with components of the detector 30 is effected. Specifically, the deflection mirror 23 for deflecting the luminescence radiation to be detected onto the spectrometer 30 can be connected directly to the detector unit 21, as shown e.g. in FIG. 2.

FIG. 7 shows a modified variant in which the deflection mirror 23 is applied directly to a common carrier with the detector row 22, i.e. specifically to the silicon substrate 42. Alternatively, the deflection mirror 23 can e.g. also be applied to a cover glass of the detector unit 21.

Figure 8:
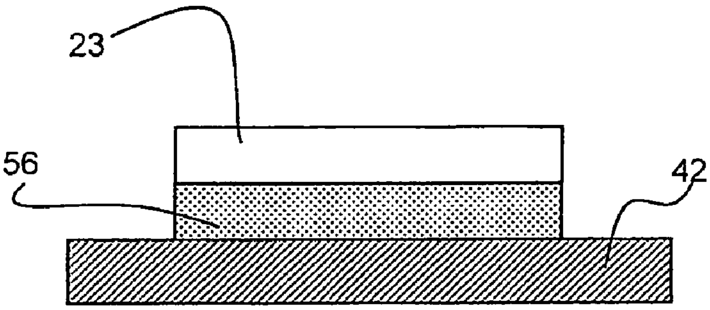
FIG. 8 a cross-sectional view along the line I-I in FIG. 7.

Further, a photodetector, such as a photocell 56, can also be present below the deflection mirror 23. This preferred variant is shown by way of example in FIG. 8 which shows a cross section along the line I-I of FIG. 7. In this case, the deflection mirror 23 applied to the photocell 56 is at least partly transparent to the wavelengths to be measured by the photocell 56. The photocell 56 can again be used for calibrating purposes and/or for evaluating other properties of the luminescence radiation.

As illustrated in FIG. 4, the detector row 22 can preferably be applied asymmetrically to the carrier, i.e. the silicon substrate 42, not only for reasons of a compact sensor design, as illustrated in FIG. 4, but also for attaching further optical components 23, 56.

As mentioned, due to the very low signal intensities of the luminescence radiation normally expected in the check of bank notes BN, a calibration of the luminescence sensor 12 will be required during ongoing operation, i.e. specifically e.g. in the pauses between two bank note measuring cycles of the luminescence sensor 12. A possible measure already described is to use the reference samples 32.

According to a further idea, this can also be done by an active mechanical displacement of the optical components of the luminescence sensor 12, whereby the displacement can be controlled e.g. by an external control unit 11 or preferably by an internal control unit 50 in dependence on measuring values of the luminescence sensor 12.

For example, the component of the imaging grating 24 can be mounted displaceably in the direction S by an actuator 25. It is likewise possible to use other components not shown to obtain a mechanical displacement of other optical components, such as the detector 21 which can be displaceable actively driven e.g. in the direction of the arrow D in FIG. 2. A displacement of the optical components in more than one direction can also be carried out.

Thus, an evaluation of the measuring values of the luminescence sensor 12 can e.g. be carried out during the ongoing operation of the luminescence sensor 12, and if the measuring values (e.g. of the detector row 22, the further detector unit 27 or the photocell 33) or quantities derived therefrom deviate from certain reference values or ranges, an active mechanical displacement of single or several optical components of the luminescence sensor 12 can be carried out to obtain an increased signal gain and a compensation of undesirable changes e.g. due to temperature fluctuations triggered by the illumination or electronics, or signs of aging of optical components. This is particularly important for a detector unit 21 with few pixels 40.

To increase the lifetime of the light sources of the luminescence sensor 12, it can also be provided that for example the laser diode 14 is driven at high power only when a bank note BN is located in the area of the measuring window, i.e. the front glass 18.

Further alternatives or additions are of course also conceivable for the above-described variants.

While examples in which the imaging grating 24 has a concavely curved surface were described with respect to FIGS. 2 and 4, a plane grating can alternatively also be used. The structure of such a luminescence sensor 12 is illustrated by way of example in FIG. 10. The radiation emanating from the bank note BN to be checked and detected through an entrance window 18 also falls in this case through a collimation lens 17 onto a beam splitter 16 from which the light is deflected by 90° and falls through a lens 19 and a filter 20 for illumination suppression onto a first spherical collimator mirror 70. From said mirror 70 the radiation is deflected onto a plane grating 71. The light spectrally decomposed by the latter is then directed through a second spherical collimator mirror 72 and a cylindrical lens 73 onto a detector array 21.

Figure 10:
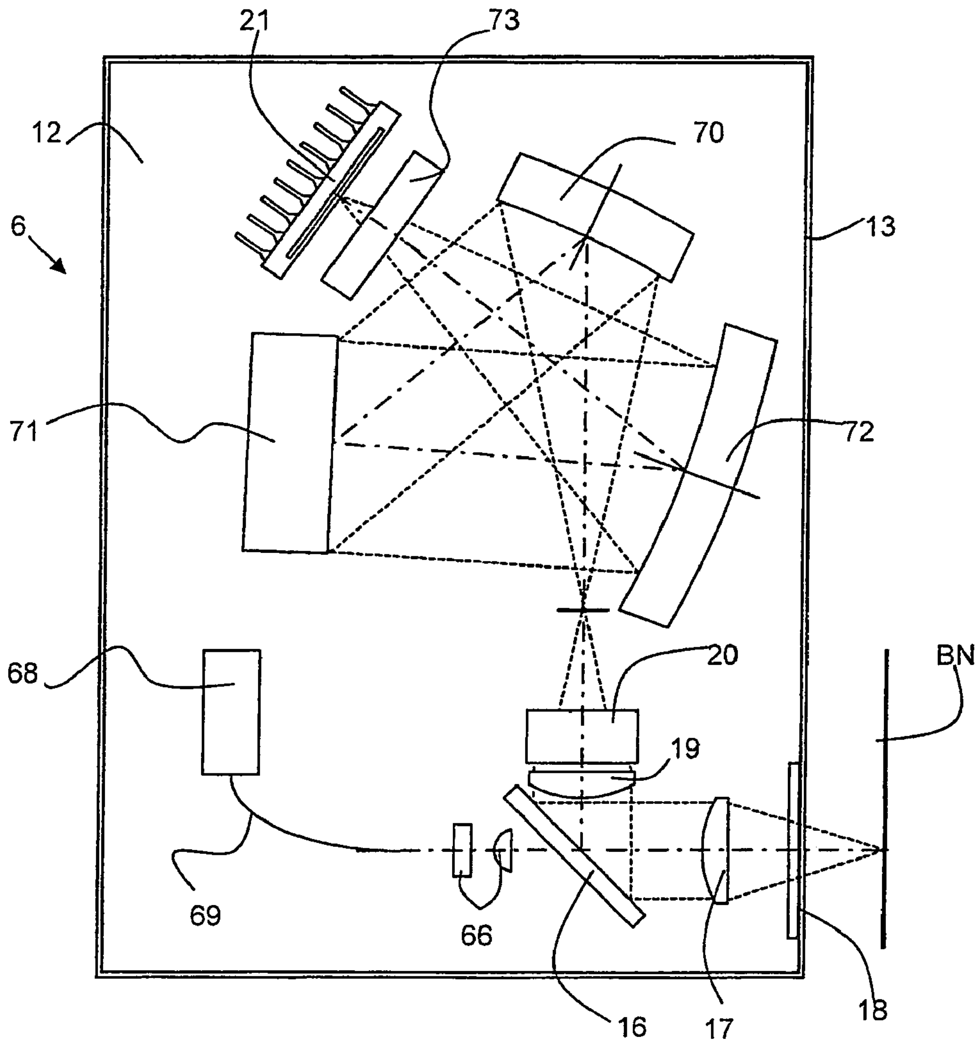
FIG. 10 a schematic side view of the inside of an alternative inventive luminescence sensor.

The luminescence sensor 12 of FIG. 10 is further characterized in that the illumination light is coupled in by means of a light guide coupling. Specifically, the light produced by a laser light source 68 is radiated through a light guide 69, a beam shaping optic 66, the beam splitter 16, the collimation lens 17 and the entrance window 18 onto the bank note to be checked. Since light guides 69 are flexible and deformable so that the illumination beam path can extend (largely) wherever desired, it is e.g. possible to fasten the light source at a particularly space-saving place in the housing 13.

Figure 11:
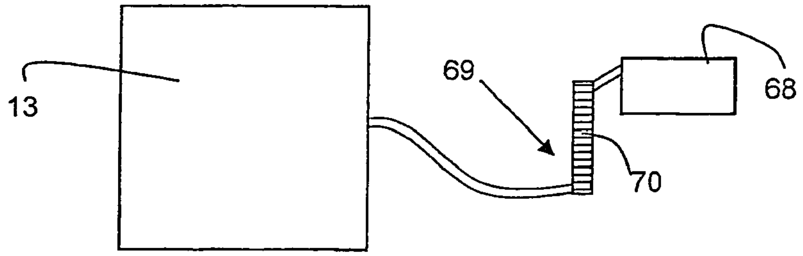
FIG. 11 a schematic view of an inventive luminescence sensor with an external light source.

In particular when such light guides are used, the light source can even be mounted outside the housing 13 of the luminescence sensor 12. This spatial separation has the advantage that the heat produced by the light source 68 is interferes considerably less with the operation and the adjustment of the other optical components located in the housing 13 and in particular also the highly sensitive detectors 21. FIG. 11 shows a corresponding schematic example in which a light source 68 irradiates into a light guide 69 which leads into the housing 13 of a luminescence sensor 12. The housing 13 can be constructed by way of example like that of FIG. 10, the only difference being that the light source 68 is thus located outside the housing 13 so that the light guide 69 also extends outside the housing 13.

A further special feature of the light coupling e.g. according to FIG. 11 is that the light guide 69 connecting the light source 69 and the housing 13 is coiled in spiral shape in a middle area 70 shown schematically in a cross-sectional view in FIG. 11. When the light source 68 irradiates into the light guide 69 there is a series of total reflections in the light guide 69. This causes the beam cross section of the coupled-in laser radiation of the light source 68 to be spatially homogenized. This has the advantage that the illumination fluctuates less during the check so that more reproducible check results can be achieved. For this purpose the light guide need not necessarily be coiled in a spiral shape in a plane, however. What is essential is rather only that the light guide has a certain length. Thus, the light guide 69 will preferably have a length of 1 m to 20 m at a fiber cross section of 50 μm to 200 μm.

Likewise, it is alternatively conceivable that the irradiation of the bank note to be checked is effected exclusively via optical components present outside the housing 13, and the luminescence sensor 12 comprises inside the housing 13 only the optical components that are used for measuring the radiation emanating from the illuminated bank note.

For stabilizing the illumination beam it is e.g. also possible to use a so-called DFB laser, in which an additional grating is built into the resonator of the laser, or a so-called DFR laser, in which an additional grating is built in outside the resonator of the laser.

Although preferred variants of the check using a grating spectrometer, i.e. a spectrometer 30 with an imaging grating 24, were described above by way of example, it is basically also possible to do without a grating spectrometer and use e.g. a spectrometer 30 with a prism for spectral dispersion or perform a measurement using different filters for filtering out different wavelengths or wavelength ranges to be detected in the luminescence radiation. This can be used in particular also for a multitrack or a highly sensitive measurement.

Figure 12:
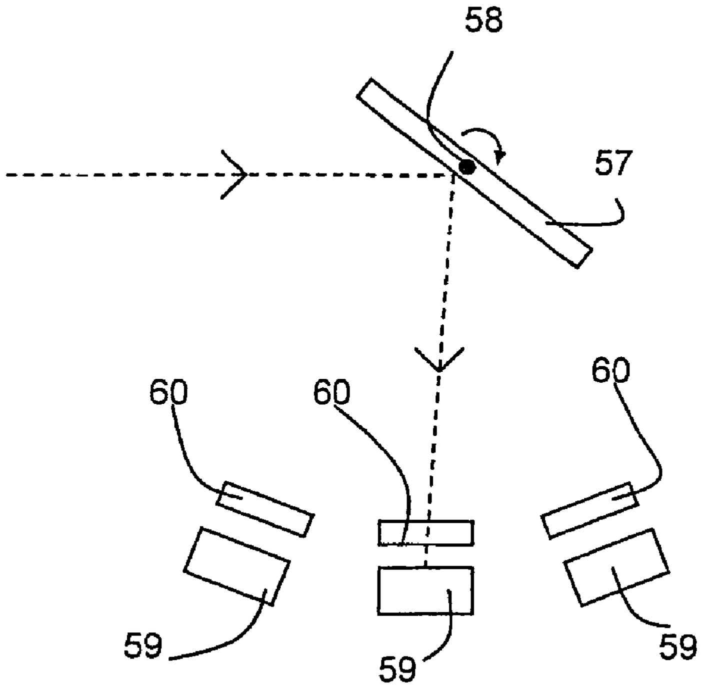
FIG. 12 a schematic view of a part of a further inventive luminescence sensor.

An example of a luminescence sensor 1 without a grating spectrometer is illustrated in FIG. 12. FIG. 12 shows schematically only the detection part of a luminescence sensor. All other components such as the housing, the illumination and the imaging optics are omitted for clarity's sake. According to this example of FIG. 12, the beam emanating from the bank note BN to be checked is deflected via a deflection mirror 57 rotatable around a rotation axis 58 selectively onto single detectors 59 which are sensitive to different wavelengths or wavelength ranges. This can be done firstly by selecting detector areas photosensitive in different wavelength ranges for the detectors 59. However, it is also possible, as indicated by way of example in FIG. 12, to dispose filters 60 for different wavelength ranges upstream of the detectors 59 and preferably also fasten them to the latter themselves.

It is likewise possible to use a so-called filter wheel with different filters. Rotation of the filter wheel then causes the individual different filters to successively cross the light beam of the bank note BN to be checked that is subsequently incident on the detector.

Figure 13:
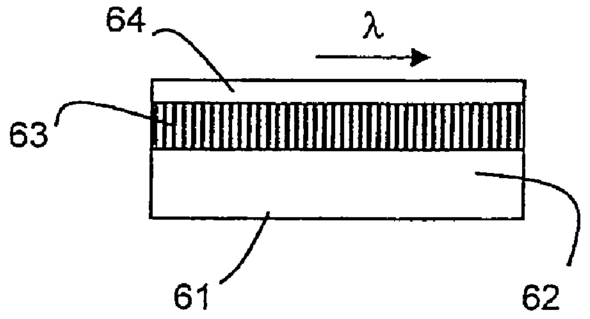
FIG. 13 a schematic view of a detector part of yet another inventive luminescence sensor.

FIG. 13 shows very schematically a detector 61 according to yet another example. The detector has a row or an array of same-type photosensitive pixels 63 on a substrate 62. On the detector 61 there is mounted above the pixels 63 a filter 64 which has a gradient of the filter wavelength that is indicated in the direction of the arrow. This means that different wavelengths are filtered out at different places of the filter 64, regarded in the direction of the arrow. The use of such a filter 64 with a filter wavelength gradient has the advantage that the light to be checked can be radiated directly onto the detector 61, and no wavelength dispersing elements such as the grating 24 or the deflection mirrors 23, 57 are required. The structure of the luminescence sensor 1 can thus be designed particularly simply and with fewer components.

Moreover, it is for example also possible to use the active optical displacement of single components advantageously not only in the particularly preferred example of a luminescence sensor, but also with other, in particular other optical, sensors. Furthermore, e.g. the special embodiment of the spectrometer is also of advantage when the luminescence sensor itself does not have a light source for exciting luminescence radiation.

Further, the inventive system can also be so designed that the measuring values of the luminescence sensor 12 of one bank note BN are still being evaluated while measuring values of a subsequent bank note BN are already being sensed at the same time. The evaluation of the measuring values of the previous bank note BN must be done so fast, however, that the individual gates 7 of the transport path 5 can be switched fast enough for deflecting the previous bank note BN into the associated storage pocket 9.

The inventive apparatuses and methods consequently permit a simple and reliable check and distinction of luminescent value documents. The check can be effected e.g. by the light source 14 producing a light with a first wavelength with a given intensity for a certain time duration 0-$t_P$ for exciting the feature substance. The light of the light source 14 excites the feature substance of the bank note BN to be checked transported past the front glass 18 in the direction T, whereupon the feature substance emits luminescence light of a second wavelength. The intensity of the emitted luminescence light increases during the time duration 0-$t_P$ of the excitation according to a certain principle. The manner of increase and decrease of the intensity of the emitted luminescence light is dependent on the feature substance used and on the exciting light source 14, i.e. its intensity and wavelength or wavelength distribution. After the end of the excitation at the time $t_P$ the intensity of the emitted luminescence light decreases according to a certain principle.

With the help of the spectrometer 30 the luminescence light emanating from the bank notes BN perpendicularly, i.e. parallel to the excitation light, is now detected and evaluated. By evaluating the signal of the detector unit 21 at one or more certain times $t_2$, $t_3$ it can be checked particularly reliably whether an authentic bank note BN is present, since only the feature substance used for the bank note BN or the combination of feature substances used has such a decay behavior. The check of decay behavior can be effected by means of the above-described comparison of the intensity of the luminescence light at one or more certain times with given intensities for authentic bank notes BN. It can also be provided that the pattern of intensity of the luminescence light is compared with given patterns for known bank notes BN.

The invention claimed is:

1. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction.

2. The apparatus according to claim 1, wherein the extension of the illumination area in the transport direction is at least twice as long as the extension perpendicular to the transport direction.

3. The apparatus according to claim 1, wherein an image area of the luminescence sensor extends in the transport direction of the value document upon transportation of the document past the luminescence sensor.

4. The apparatus according to claim 1, wherein at least one of the length and the width of the image area is smaller than the corresponding dimensions of the illumination area of the light source.

5. The apparatus according to claim 1, wherein the image area and the illumination area on the value document are at least partly or completely overlapping at a given time.

6. The apparatus according to claim 1, wherein the luminescence sensor has one or more light sources which emit at different wavelengths.

7. The apparatus according to claim 1, wherein the luminescence sensor has at least one detector row with a small number of pixels.

8. The apparatus according to claim 1, wherein the luminescence sensor has at least one detector element that measures radiation outside the luminescence spectrum of the value documents.

9. The apparatus according to claim 1, wherein the luminescence sensor has an InGaAs detector row on a silicon substrate.

10. The apparatus according to claim 1, wherein the detector unit of the luminescence sensor possess one or more of the features: it is capable of detecting a spectral range of less than 500 nm; an imaging grating of the luminescence sensor has more than about 300 lines/mm; the distance between the imaging grating and the detector unit is less than about 70 mm.

11. The apparatus according to claim 1, wherein at least one of the light source, the luminescence sensor, a control unit for signal processing of either or both the measuring values of the luminescence sensor and for power control of components of the luminescence sensor are integrated in either or both a common housing and separate housings.

12. The apparatus according to claim 1, wherein the light source is arranged to irradiate perpendicularly the value document to be checked, and either or both the luminescence sensor is arranged to detect luminescence radiation emanating from the irradiated value document perpendicularly, and the radiation produced by the light source is radiated via a light guide onto the value document to be checked.

13. The apparatus according to claim 1, wherein the luminescence sensor has a deflection mirror either or both arranged to fold the beam path of the luminescence radiation to be measured and to deflect the luminescence radiation to be measured onto another optical unit.

14. The apparatus according to claim 1, wherein the luminescence sensor has a photodetector with a deflection mirror located on or above the surface thereof, which is at least partly transparent to the wavelengths to be measured by the photodetector.

15. The apparatus according to claim 1, wherein the luminescence sensor has a filter disposed upstream of the photodetector in the beam path of the radiation to be measured.

16. The apparatus according to claim 1, wherein the luminescence sensor has a component having both a photosensitive detector unit for luminescence radiation and components for imaging the luminescence radiation onto the photosensitive detector unit.

17. The apparatus according to claim 1, wherein the luminescence sensor has a plurality of detector units for detecting different properties of the luminescence radiation.

18. The apparatus according to claim 1, wherein different detector units are arranged to check different feature substances of the value document.

19. The apparatus according to claim 1, wherein one detector unit is arranged to perform time-integrated measurement of the luminescence radiation and another detector unit for time-resolved measurement of the luminescence radiation.

20. The apparatus according to claim 1, wherein a detector unit is disposed on a tilt with respect to a device for spectral decomposition to avoid a re-reflection onto the device.

21. The apparatus according to claim 1, wherein the luminescence sensor includes a reference sample with a luminescent feature substance.

22. The apparatus according to claim 1, wherein the luminescence sensor includes a device arranged to actively mechanically displace optical components of the luminescence sensor.

23. The apparatus according to claim 22, wherein the active mechanical displacement of optical components of the luminescence sensor is controllable by a control unit in dependence on measured values of the luminescence sensor.

24. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein the luminescence sensor has at least one detector row with pixels of different dimensions in a dispersion direction of the luminescence radiation of different extensions that is to be measured.

25. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein the luminescence sensor has a detector row which is applied to a substrate asymmetrically.

26. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein one detector unit is designed for spectrally resolved measurement of the luminescence radiation and another detector unit for non-spectrally resolved measurement of the luminescence radiation.

27. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein one detector unit is arranged to measure the zeroth order of spectrally decomposed luminescence radiation and another detector unit for measuring another order of spectrally decomposed luminescence radiation.

28. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein the luminescence sensor includes a further light source for irradiating a reference sample provided with a luminescent feature substance.

29. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein the measured values of the luminescence sensor may be evaluated for one value document while measured values of a subsequent value document are already being sensed at the same time.

30. An apparatus for checking luminescent value documents, comprising a luminescence radiation exciting light source and a luminescence sensor arranged to detect with spectral resolution luminescence radiation excited by the light source emanating from a value document illuminated by the light source, said light source producing on the value document when the document is transported in a transport direction past the luminescence sensor an illumination area extending in the transport direction, wherein the luminescence sensor comprises a detector row having single pixels and at least two separate amplifier stages and subsequent analog/digital converters, wherein each of said amplifier stages amplifies measuring signals of only one of said pixels and supplies the amplified signals to a corresponding one of said subsequent analog/digital converters, and wherein the measuring signals of the pixels amplified by said amplifier stages are read in parallel.

* * * * *